(12) United States Patent
Bilski

(10) Patent No.: US 6,550,530 B1
(45) Date of Patent: Apr. 22, 2003

(54) TWO PHASE VACUUM PUMPED LOOP

(75) Inventor: W. John Bilski, Mohnton, PA (US)

(73) Assignee: Thermal Corp., Stanton, DE (US)

(*) Notice: Subject to any disclaimer, the term of this patent is extended or adjusted under 35 U.S.C. 154(b) by 0 days.

(21) Appl. No.: 10/126,169

(22) Filed: Apr. 19, 2002

(51) Int. Cl.[7] ............................................. F28D 15/00
(52) U.S. Cl. ..................... 165/104.26; 165/104.25; 361/700; 174/15.2; 257/715; 29/890.032
(58) Field of Search ..................... 165/104.22, 104.25, 165/104.26, 104.33; 361/699, 700; 174/16.3, 15.2; 257/714, 715, 716; 29/890.032

(56) References Cited

U.S. PATENT DOCUMENTS

| | | | |
|---|---|---|---|
| 4,220,195 A | * 9/1980 | Borgoyn et al. | 165/104.26 |
| 4,612,978 A | * 9/1986 | Cutchaw | 165/104.33 |
| 4,750,543 A | 6/1988 | Edelstein | |
| 4,899,810 A | 2/1990 | Fredley | |
| 4,903,761 A | * 2/1990 | Cima | 165/104.26 |
| 5,117,901 A | * 6/1992 | Cullimore | 165/104.26 |
| 5,303,768 A | 4/1994 | Alario et al. | |
| 5,839,290 A | 11/1998 | Nazeri | |
| 6,437,981 B1 | * 8/2002 | Newton et al. | 361/700 |

* cited by examiner

Primary Examiner—Henry Bennett
Assistant Examiner—Terrell McKinnon
(74) Attorney, Agent, or Firm—Duane Morris LLP

(57) ABSTRACT

A heat transfer system includes a wick, a vacuum pump and a heat exchanger. The wick receives a condensed liquid. The wick receives heat from a heat source. The vacuum pump reduces pressure in the wick while turned on, so that at least a portion of the liquid evaporates within the wick to form a vapor that is pumped by the pump. The heat exchanger is coupled to receive the vapor from the pump. The heat exchanger rejects heat to form the condensed liquid from the vapor. The heat exchanger returns the condensed liquid to the wick.

18 Claims, 1 Drawing Sheet

TWO PHASE VACUUM PUMPED LOOP

FIELD OF THE INVENTION

The present invention is related to thermal control systems generally, and more specifically to two phase pumped loop systems.

BACKGROUND OF THE INVENTION

Two phase pumped loop cooling loops are known. For example, U.S. Pat. No. 4,750,543 describes a pumped loop two-phase heat transfer system, operating at a nearly constant temperature throughout. The system includes a plurality of independently operating grooved capillary heat exchanger plates supplied with working fluid through independent flow modulation valves connected to a liquid supply line, a vapor line for collecting vapor from the heat exchangers, a condenser between the vapor and the liquid lines, and a fluid circulating pump between the condenser and the heat exchangers.

The '543 patent requires a sensor controlled flow modulation valve to regulate the flow. This system requires elaborate controls if the device being cooled varies the amount of heat generated over time. Also, it is difficult to measure the flow rate of the system. All of these systems operate at slightly above the temperature of the cooling fluid, typically air.

An improved thermal control system is desired.

SUMMARY OF THE INVENTION

One aspect of the present invention is a heat transfer system, comprising a wick, a vacuum pump and a heat exchanger. The wick receives a condensed liquid. The wick receives heat from a heat source. The vacuum pump reduces pressure in the wick while turned on, so that at least a portion of the liquid evaporates within the wick to form a vapor that is pumped by the pump. The heat exchanger is coupled to receive the vapor from the pump. The heat exchanger rejects heat to form the condensed liquid from the vapor. The heat exchanger returns the condensed liquid to the wick.

Another aspect of the invention is a method for transferring heat, comprising the steps of: transferring heat from a heat source to a wick; reducing pressure in the wick; evaporating a liquid within the wick to form a vapor; pumping the vapor out from the wick; condensing the vapor outside of the wick to form a condensed liquid; and returning the condensed liquid to the porous wick.

DETAILED DESCRIPTION

Figure 1:
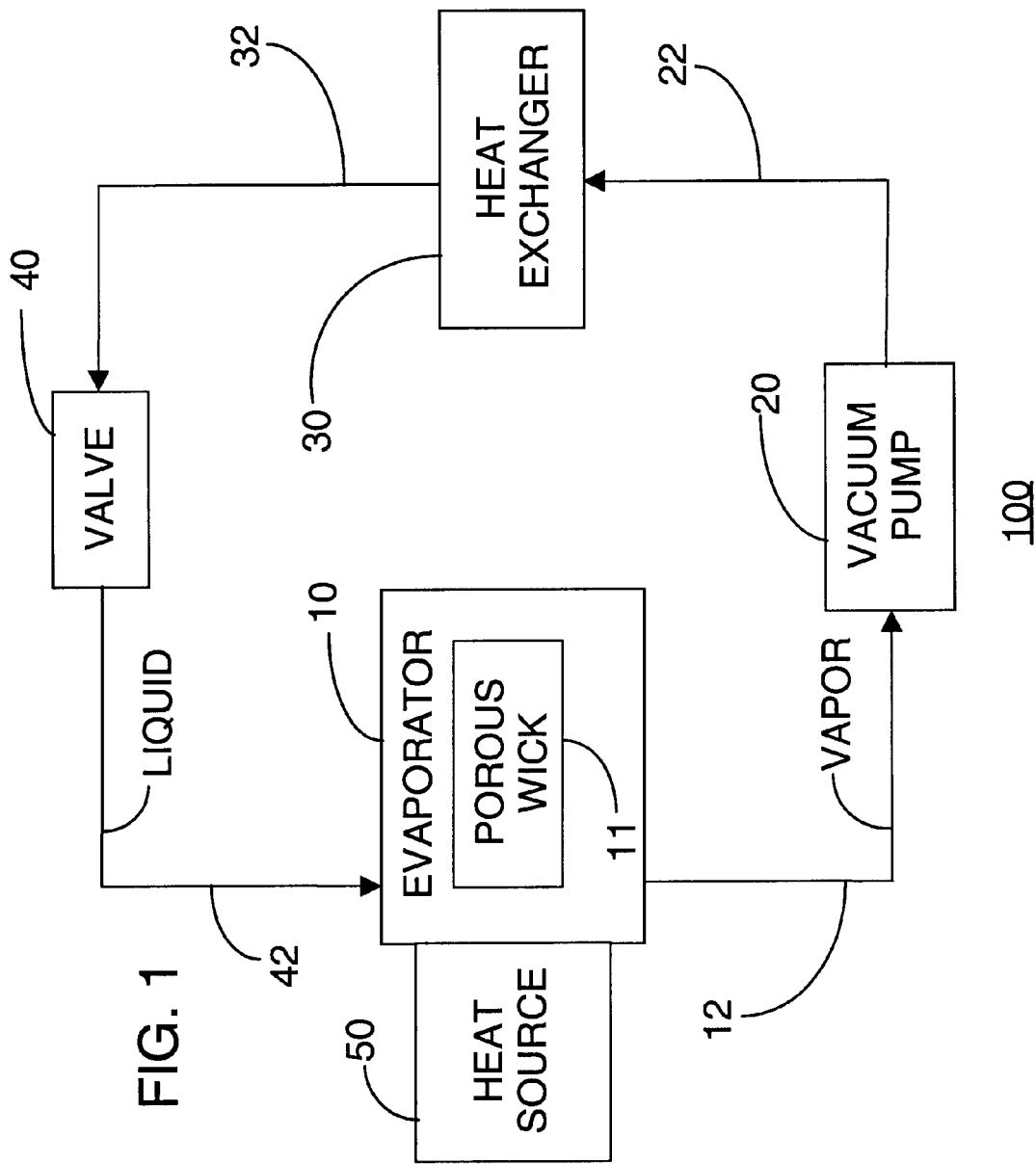
FIG. 1 is a diagram of an exemplary system according to the present invention.

The present invention is a heat transfer system 100 and a method of transferring heat. The exemplary system 100 comprises an evaporator 10 having a wick 11, a pump 20, which may be a vacuum pump, a heat exchanger 30, a valve 40 and conduits 12, 22, 33 and 42 connecting the evaporator, pump, heat exchanger and valve.

The wick 11 receives a condensed liquid by way of conduit 41. The wick 11 also receives heat from a heat source 50. The exemplary pump is a vacuum pump 20 that reduces pressure, forming a partial vacuum in the wick 11 while the pump is turned on, so that at least a portion of the liquid evaporates within the wick to form a vapor that a is pumped by the pump. The heat exchanger 30 is coupled to receive the vapor from the pump 20. The heat exchanger 30 rejects heat to form the condensed liquid from the vapor. The heat exchanger returns the condensed liquid to the wick 11.

Preferably, the wick 11 is porous and is made of a very fine metal powder, such as a copper or aluminum powder. Other fine materials, such as microencapsulated phase change materials (MPCMs) may be used in the wick. MPCMs would make the temperature within the wick more uniform. The very fine powder results in smaller pores in the wick, and greater pressure drop through the wick. This also provides greater boiling point suppression. Although a variety of known wick types may be used, a porous wick such as a metal powder wick 11 has an advantage that there is a pressure drop through the porous wick sufficient to substantially prevent flow while the vacuum pump 20 is turned off. That is, the flow should at most be a negligible amount while the pump 20 is turned off. The porous structure of the wick 11 also promotes capillary action of the liquid in the wick. Using a metal powder wick: provides improved heat transfer and isothermality as well. Likewise the pore side of the wick could be tailored to various fluids with varying fluid properties (surface tension, viscosity, etc.).

The wick 11 is encased within a housing of evaporator 10, to prevent egress of the vapor from the system, and prevent entry of air or other materials into the system through the sides of the wick. The metal powder of wick 11 may optionally be sintered. Because the wick 11 is encased in the housing of evaporator 10, the powder could alternatively be contained within the housing without sintering the powder. For example, screens (not shown) may be placed at the entrance and exit where conduits 42 and 12 connect to evaporator 10, to prevent egress of the powder into the conduits.

Alternatively, still other known wick structures such as ceramic (e.g., BeO) wicks, screens, and the like may be used. If the wick 11 is of a type that does not have the desired head loss to minimize flow while the vacuum pump 20 is turned off, other known techniques for creating a pressure drop may be used, such as a reduced diameter section or constriction at the entrance or exit of the wick 11.

The vacuum pump draws a partial vacuum. The vacuum causes the condensed fluid to flow into the wick 11. The pressure drop across the wick 11, in combination with the heat input from heat source 50, vaporizes the fluid, causing the heat source 50 to be evaporatively cooled. Because the heat removal is accomplished through the phase change, the evaporator 10 maintains a substantially constant temperature during operations, i.e., the evaporation temperature of the working fluid. The vapor generated by the evaporation is pumped through the vacuum pump 20 to the heat exchanger 30. The added energy input by the vacuum pump 20 keeps the working fluid vaporized, while increasing the pressure for delivery to the heat exchanger.

The vapor passes through the vacuum pump 20, but minimal (e.g., no more than an insignificant amount) condensed liquid passes through the vacuum pump. The flow into the pump 40 should be substantially all vapor. This minimizes damage to the pump 40 and maximizes cooling at the heat source 50. One of ordinary skill can readily size the pump 20 so that it creates enough of a partial vacuum to draw the vapor, but not draw liquid from the wick 11.

The heat exchanger 30 may be any of avariety of heat exchangers. The heat exchanger may include a heat sink with natural or forced convection cooling by either air or a pumped liquid coolant (e.g., chilled water). The heat exchanger rejects enough heat so that the vapor is all condensed to the liquid state in the heat exchanger.

The optional valve 40 is located between the heat exchanger 30 and the porous wick 11 to regulate flow of the condensed liquid back to the porous wick. The valve 40 does not perform a throttling process. The liquid passes through the valve 40 without having the condensed liquid evaporate in the valve. When the system is off, the valve could be used to prevent flow of liquid through the wick (i.e. if the wick is at the low point in the system).

An exemplary method for transferring heat comprises the steps of: transferring heat from a heat source 50 to a porous wick 11; reducing pressure in the porous wick 11; evaporating a liquid within the porous wick 11 to form a vapor; pumping the vapor out from the porous wick 11; condensing the vapor outside of the porous wick 11 to form a condensed liquid; and returning the condensed liquid to the porous wick 11.

The heat source 50 may be a device that requires cooling, such as an integrated circuit package (e.g., a microprocessor). The evaporator may be thermally coupled to the heat source 50 by a variety of methods. Preferably, the evaporator is in direct contact with the heat source. A conventional thermal interface (e.g., conductive epoxy or thermal grease) may be used to ensure a good conductive interface throughout the surface area of the evaporator, where it contacts the heat source. Alternatively, the evaporator may be connected to the heat source by way of a heat spreader (not shown) or by way of a vapor chamber, heat pipe or other heat transfer means. A heat spreader may be desirable if the heat source has one or more small hot spots, or if the heat source has a smaller area than the surface of the evaporator to which the heat source is attached.

Using the above described system and method, the heat source 50 or device can be cooled to below ambient temperature. If the liquid is condensed to ambient temperature, the vapor temperature at the evaporator will be sub-ambient due to the lower pressure.

The exemplary system is at least partially self-regulating, because the flow is partially dependent upon the heat input to the porous block. If the amount of heat transferred from the heat source 50 increases, the evaporation rate increases, causing increased vapor flow through the system. If the amount of heat transferred from the heat source 50 decreases, the evaporation rate decreases, causing decreased vapor flow through the system.

Another advantage of the exemplary system is that the flow rate can be measured more easily, because the flow between the evaporator 10 and the vacuum pump 20 is substantially 100% vapor. It is easier to measure gas flow rates than liquid flow rates, because saturated water vapor fills about 50,000 times the volume of saturated liquid at 20° C.

Although the invention has been described in terms of exemplary embodiments, it is not limited thereto. Rather, the appended claim should be construed broadly, to include other variants and embodiments of the invention, which may be made by those skilled in the art without departing from the scope and range of equivalents of the invention.

What is claimed is:

1. A heat transfer system comprising:
   a wick that receives a condensed liquid, the wick receiving heat from a heat source;
   a vacuum pump that reduces pressure at the wick while turned on, so that at least a portion of the liquid evaporates within the wick to form a vapor that is pumped by the pump; and
   a heat exchanger coupled to receive the vapor from the pump, the heat exchanger rejecting heat to form the condensed liquid from the vapor, the heat exchanger returning the condensed liquid to the wick; and wherein:
   the wick is porous and is made of a sintered metal powder, and there is a pressure drop through the wick sufficient to substantially prevent flow while the vacuum pump is turned off;
   the vapor passes through the vacuum pump, but the condensed liquid does not pass through the vacuum pump; and
   the system further comprises a valve between the heat exchanger and the wick to regulate flow of the condensed liquid back to the wick, wherein the liquid passes through the valve without having the condensed liquid evaporate in the valve.

2. A heat transfer system comprising:
   a wick that receives a condensed liquid, the wick receiving heat from a heat source,
   a vacuum pump that reduces pressure at the wick while turned on, so that at least a portion of the liquid evaporates within the wick to form a vapor that is pumped by the pump; and
   a heat exchanger coupled to receive the vapor from the pump, the heat exchanger rejecting heat to form the condensed liquid from the vapor, the heat exchanger returning the condensed liquid to the wick;
   wherein the vapor passes through the vacuum pump, but minimal condensed liquid passes through the vacuum pump.

3. The system of claim 2 wherein the wick is porous and is made of a metal powder.

4. The system of claim 2 wherein there is a pressure drop through the wick sufficient to substantially prevent flow while the vacuum pump is turned off.

5. The system of claim 2 further comprising a valve between the heat exchanger and the wick to regulate flow of the condensed liquid back to the wick.

6. The system of claim 5, wherein the liquid passes through the valve without having the condensed liquid evaporate in the valve.

7. A method for transferring heat, comprising the steps of:
   (a) conducting heat from a heat source to a porous metal powder wick;
   (b) forming a partial vacuum using a vacuum pump to draw a condensed fluid into the porous wick;
   (c) evaporating the condensed liquid within the porous wick to form a vapor;
   (d) pumping the vapor out from the porous wick using the vacuum pump, while passing minimal liquid through the vacuum pump;
   (e) condensing the vapor in a heat exchanger to form the condensed liquid from the vapor; and
   (f) returning the condensed liquid to the porous wick.

8. The method of claim 7, further comprising substantially preventing flow of the vapor to the heat exchanger by turning the vacuum pump off.

9. The method of claim 7, further comprising regulating flow of the condensed liquid back to the porous wick using a valve without evaporation taking place within the valve.

10. A method for transferring heat, comprising the steps of:

(a) transferring heat from a heat source to a wick;

(b) reducing pressure in the wick with a vacuum pump;

(c) evaporating a liquid within the wick to form a vapor;

(d) pumping the vapor out from the wick without pumping liquid from the wick;

(e) condensing the vapor outside of the wick to form a condensed liquid; and (f) returning the condensed liquid to the wick.

11. The method of claim 10, wherein the wick is porous and is made of a metal powder.

12. The method of claim 10 wherein there is a pressure drop through the wick sufficient to substantially prevent flow while the vacuum pump is turned off.

13. The method of claim 10 wherein step (d) is performed with the vacuum pump.

14. The method of claim 10 further comprising regulating flow of the condensed liquid back to the wick using a valve without evaporation taking place within the valve.

15. The method of claim 10 wherein step (a) includes contacting a device to be cooled with an evaporator containing the wick.

16. The method of claim 15, wherein step (a) includes cooling the device to below ambient temperature.

17. The method of claim 10 wherein a partial vacuum in the wick draws the condensed liquid into the wick.

18. A method for transferring heat, comprising the steps of:

(a) transferring heat from a heat source to a wick;

(b) reducing pressure in the wick;

(c) evaporating a liquid within the wick to form a vapor;

(d) pumping the vapor out from the wick, while passing minimal liquid through the vacuum pump;

(e) condensing the vapor outside of the wick to form a condensed liquid; and (f) returning the condensed liquid to the wick.

\* \* \* \* \*